(12) United States Patent
Sakagami et al.

(10) Patent No.: US 9,771,300 B2
(45) Date of Patent: *Sep. 26, 2017

(54) WHITE GLASS

(71) Applicant: ASAHI GLASS COMPANY, LIMITED, Chiyoda-ku (JP)

(72) Inventors: Takahiro Sakagami, Shizuoka (JP); Seiki Ohara, Tokyo (JP); Junko Miyasaka, Tokyo (JP); Hiroyuki Hijiya, Tokyo (JP); Kazutaka Ono, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 131 days.

This patent is subject to a terminal disclaimer.

(21) Appl. No.: 14/603,739

(22) Filed: Jan. 23, 2015

(65) Prior Publication Data

US 2015/0140336 A1   May 21, 2015

Related U.S. Application Data

(63) Continuation of application No. PCT/JP2013/069937, filed on Jul. 23, 2013.

(30) Foreign Application Priority Data

Jul. 25, 2012 (JP) ................. 2012-164527
Jan. 16, 2013 (JP) ................. 2013-005311

(51) Int. Cl.
| C03C 3/097 | (2006.01) |
| C03C 4/02 | (2006.01) |
| C03C 21/00 | (2006.01) |
| C03C 4/18 | (2006.01) |
| C03C 3/078 | (2006.01) |

(52) U.S. Cl.
CPC ............. *C03C 3/097* (2013.01); *C03C 3/078* (2013.01); *C03C 4/02* (2013.01); *C03C 4/18* (2013.01); *C03C 21/002* (2013.01); *C03C 2204/00* (2013.01); *Y10T 428/315* (2015.01)

(58) Field of Classification Search
CPC ........... C03C 1/04; C03C 3/097; C03C 4/005; C03C 4/02
See application file for complete search history.

(56) References Cited

U.S. PATENT DOCUMENTS

| 3,275,492 | A | 9/1966 | Herbert |
| 4,298,390 | A | 11/1981 | Flannery et al. |
| 4,897,370 | A | 1/1990 | Horiguchi et al. |
| 5,034,353 | A | 7/1991 | Shibuya et al. |
| 5,070,043 | A * | 12/1991 | Amundson, Jr. ....... C03C 10/16 501/3 |
| 5,432,130 | A * | 7/1995 | Rheinberger ........... C03C 3/097 106/35 |
| 5,480,844 | A | 1/1996 | Matsui et al. |
| 6,745,057 | B1 | 6/2004 | Hankui |
| 9,487,440 | B2 * | 11/2016 | Miyasaka ............. C03C 21/002 |
| 2015/0111030 | A1 | 4/2015 | Miyasaka et al. |
| 2015/0266770 | A1* | 9/2015 | Miyasaka ............... C03C 3/078 428/34.4 |
| 2015/0266771 | A1* | 9/2015 | Miyasaka ............... C03C 3/078 428/34.4 |
| 2015/0315068 | A1* | 11/2015 | Clatot ..................... C03C 3/062 501/36 |
| 2015/0329409 | A1* | 11/2015 | Miyasaka ............... C03C 3/097 428/34.4 |

FOREIGN PATENT DOCUMENTS

| CN | 104254501 A | 12/2014 |
| JP | 57-111258 | 7/1982 |
| JP | 64-5939 | 1/1989 |
| JP | 2-149447 | 6/1990 |
| JP | 7-203799 | 8/1995 |
| JP | 3838815 | 8/2006 |

OTHER PUBLICATIONS

International Search Report issued in PCT/JP2013/069937 dated Oct. 8, 2013.
U.S. Appl. No. 14/685,131, filed Apr. 13, 2015, Miyasaka, et al.
U.S. Appl. No. 14/733,393, filed Jun. 8, 2015, Miyasaka, et al.
U.S. Appl. No. 14/732,975, filed Jun. 8, 2015, Miyasaka, et al.

\* cited by examiner

*Primary Examiner* — Elizabeth A Bolden
(74) *Attorney, Agent, or Firm* — Oblon, McClelland, Maier & Neustadt, L.L.P.

(57) ABSTRACT

A white glass contains, in terms of mole percentage on the basis of the following oxides, from 50 to 80% of $SiO_2$, from 0 to 10% of $Al_2O_3$, from 11 to 30% of MgO, from 0 to 15% of $Na_2O$ and from 0.5 to 15% of $P_2O_5$.

24 Claims, 1 Drawing Sheet

WHITE GLASS

TECHNICAL FIELD

The present invention relates to a while glass preferably used as an exterior member of an electronic device such as a portable and usable information device or communication device.

BACKGROUND ART

Considering various factors such as decorativeness, scratch resistance, processability or cost, a material is appropriately selected from resins and is used as a housing of an electronic device such as a mobile phone. Particularly, a housing of a portable terminal was often constituted of a material such as plastics or a resin (see Patent Document 1).

PRIOR ART DOCUMENTS

Patent Document

Patent Document 1: Japanese Patent No. 3838815

SUMMARY OF THE INVENTION

Problems that the Invention is to Solve

However, in the case where a housing is constituted of a material such as plastics or a resin, there was a problem that the housing is liable to be scratched. The present invention has an object to provide a scratch-resistant white glass that is suitable for use as a housing of an electronic device.

The present invention provides the following white glass, strengthened white glass, electronic device, exterior member of an electronic device, exterior member of communication device or information device, method for manufacturing a white glass and method for manufacturing a strengthened white glass. In the present specification, white is not limited to white color and includes cases of being colored with black, gray, green, blue, red or the like.

(1) A white glass comprising, in terms of mole percentage on the basis of the following oxides, from 50 to 80% of $SiO_2$, from 0 to 10% of $Al_2O_3$, from 11 to 30% of MgO, from 0 to 15% of $Na_2O$ and from 0.5 to 15% of $P_2O_5$.

(2) The white glass according to (1), wherein a content of $Al_2O_3$ is 8% or less.

(3) The white glass according to (1) or (2), wherein a content of $SiO_2$ is 55% or more.

(4) The white glass according to any one of (1) to (3), wherein a content of $Na_2O$ is 1% or more.

(5) The white glass according to any one of (1) to (4), comprising from 66 to 72% of $SiO_2$, from 0 to 4% of $Al_2O_3$, from 16 to 24% of MgO and from 4 to 10% of $Na_2O$.

(6) The white glass according to any one of (1) to (5), comprising 10% or less of $P_2O_5$.

(7) The white glass according to any one of (1) to (6), comprising 3% or more of $P_2O_5$.

(8) The white glass according to any one of (1) to (4), (6) and (7), comprising 58% or more and less than 66% of $SiO_2$, from 2 to 6% of $Al_2O_3$, from 11 to 18% of MgO, from 8 to 13% of $Na_2O$, and from 3 to 7% of $P_2O_5$.

(9) The white glass according to (1), comprising, in terms of mole percentage on the basis of the following oxides, from 60 to 73% of $SiO_2$, from 0 to 5% of $Al_2O_3$, from 13 to 30% of MgO, from 0 to 13% of $Na_2O$ and from 0.5 to 4.5% of $P_2O_5$.

(10) The white glass according to any one of (1) to (9), comprising, in terms of mass percentage, more than 10% of MgO.

(11) The white glass according to any one of (1) to (10), comprising from 0 to 9% of $B_2O_3$.

(12) The white glass according to any one of (1) to (10), comprising from 0 to 6% of $B_2O_3$.

(13) The white glass according to any one of (1) to (12), comprising from 0 to 4.5% of $ZrO_2$.

(14) The white glass according to any one of (1) to (13), wherein $MgO/SiO_2$ which is a ratio of a content of MgO to a content of $SiO_2$ is 0.45 or less and 0.14 or more.

(15) The white glass according to any one of (1) to (14), comprising at least one of CaO, SrO and BaO in a total amount of from 0.2 to 12%.

(16) The white glass according to (15), comprising CaO in a range of from 0.2 to 3%.

(17) The white glass according to any one of (1) to (16), comprising from 0 to 5% of $La_2O_3$.

(18) The white glass according to any one of (1) to (17), wherein a crystal is not precipitated.

(19) The white glass according to any one of (1) to (18), wherein a linear transmittance of light having a wavelength of 600 nm at a thickness of 1 mm is 50% or less.

(20) The white glass according to any one of (1) to (19), wherein a total light reflectance of light having a wavelength of 600 nm is 30% or more.

(21) A strengthened white glass obtained by chemically strengthening the white glass according to any one of (1) to (20), the white glass comprising 1% or more of $Na_2O$, the strengthened white glass having a surface compressive stress layer having a thickness of 10 μm or more.

(22) The strengthened white glass according to (21), wherein a total reflectance of light having a wavelength of 600 nm is 30% or more.

(23) An electronic device comprising, as a housing, the white glass according to any one of (1) to (20) or the strengthened white glass according to (21) or (22).

(24) An exterior member of an electronic device, comprising the white glass according to any one of (1) to (20) or the strengthened white glass according to (21) or (22).

(25) An exterior member of a portable and usable communication device or information device, comprising the white glass according to any one of (1) to (20) or the strengthened white glass according to (21) or (22).

(26) A method for manufacturing a white glass having a linear transmittance of light having a wavelength of 600 nm at a thickness of 1 mm of 50% or less, the method comprising maintaining a glass containing, in terms of mole percentage on the basis of the following oxides, from 50 to 80% of $SiO_2$, from 0 to 10% of $Al_2O_3$, from 11 to 30% of MgO, from 0 to 15% of $Na_2O$ and from 0.5 to 15% of $P_2O_5$ at a temperature 50 to 400° C. higher than its annealing point for from 1 to 64 hours.

(27) The method for manufacturing a white glass according to (26), wherein a content of $Al_2O_3$ in the glass is 8% or less.

(28) The method for manufacturing a white glass according to (26) or (27), wherein a content of $SiO_2$ in the glass is 55% or more.

(29) The method for manufacturing a white glass according to any one of (26) to (28), wherein the white glass has a total light reflectance of light having a wavelength of 600 urn of 30% or more.

(30) A method for manufacturing a strengthened white glass having a linear transmittance of light having a wavelength of 600 nm at a thickness of 1 mm of 50% or less, a surface compressive stress layer having a thickness of 10 µm or more, and a surface compressive stress thereof of 300 MPa or more, the method comprising chemically strengthening the white glass according to any one of (1) to (20).

(31) The method for manufacturing a strengthened white glass according to (30), wherein the white glass has a total light reflectance of light having a wavelength of 600 nm of 30% or more.

Advantageous Effects of the Invention

According to the present invention, a scratch-resistant material suitable as a housing of an electronic device is obtained.

By the way, the electronic device described above includes a display device such as a liquid crystal panel on an outer surface thereof. However, those display devices tend to have high definition and high luminance, and with this tendency, a backlight as a light source tends to have high luminance. Light from a light source is emitted to a display device side, and in addition to this, frequently multiply reflects in the inside of a device and reaches a rear surface of an exterior housing.

Even in an organic EL (Electro-Luminescence) display that does not require a light source, similarly, there is concern over light leakage from a light-emitting element. In the case of using a metal as a material of a housing, the problem does not occur, but in the case where a material is a while material but has high transparency, there is a possibility that light from a light source passes through the housing and is recognized from the outside of the device. In the case of using such a transparent while material in a housing, a light-shielding means such as a coating film for imparting a shielding property to a visible light (hereinafter simply referred to as a "shielding property") for the while material is formed on a rear surface of a glass.

However, with high luminance of a light source of a display device as described above, in order to form a coating film having sufficient shielding property on a rear surface (a device side) of the transparent white material, it is necessary to form a thick coating film or form a film including a plurality of layers, and this increases the number of steps, leading to the increase of cost.

Furthermore, in the case where a coating film is not uniformly formed, light passes through only a thin portion of the coating film, and a housing is locally recognized brightly, and thus, beauty of the device may be impaired. For example, in a concave housing, it is necessary to form a uniform film on the entire surface of a concave surface side. However, a step of uniformly forming a coating film having sufficient shielding property on the concave surface is complicated, and this leads to the increase of cost.

Particularly, in the case of obtaining a housing having white appearance, it is assumed that a white coating layer should be formed on at least one surface of the transparent while material as described above. However, a white coating material has high transparency, and even thought a thickness of the while coating layer is increased, sufficient shielding property cannot be obtained.

For this reason, it is assumed that a black coating layer having high shielding property should be laminated to the white coating layer. However, in this case, it is necessary to increase a thickness of the white coating layer to an extent such that the black coating layer is not recognized. Thus, to obtain a white-colored housing having high shielding property using a white coating material, there is a problem that cost is very high.

According to the present invention, a white material having low transparency is obtained. Therefore, it is not necessary to separately provide a shielding means such as the above-described light-shielding film, or more inexpensive light-shielding means is enough to achieve the purpose. As a result, a white glass having a shielding property suitable for a housing of an electronic device can be inexpensively obtained. Furthermore, a white glass for a housing, having designability, can be inexpensively obtained.

MODE FOR CARRYING OUT THE INVENTION

Figure 1:
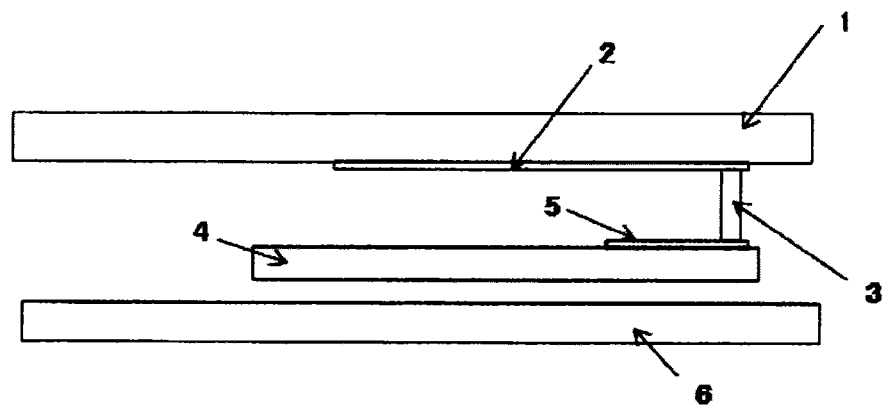
FIG. 1 is a conceptual view showing a cross-sectional structure of a portable electronic device.

Preferred embodiments of a white glass in the present invention are described below.

The white glass in the present invention is, for example, externally mounted on an electronic device. An outer surface of a mobile phone has a constitution that a display device including a liquid crystal panel or an organic EL display and an operating device including buttons, or a display device and an operating device that are integrated, such as a touch panel, are arranged on one outer surface thereof, and its periphery is surrounded with a casing material. Another outer surface is constituted of a panel. A frame material is present in a thickness portion of a device between one outer surface and another outer surface. Sometimes there is a case where those casing material and frame material, or panel and frame material are integrally constituted.

The white glass in the present invention can be used in any of the casing material, panel and frame material. The shapes of them may be a flat plate shape, and may be a concave shape or a convex shape, in which a casing material and a frame material, or a panel and a frame material constitute an integral structure.

Light source of a display device provided in the inside of an electronic device is constituted of a material to emit white light, such as light-emitting diode, organic EL or CCFL. Furthermore, there is a light source including a light-emitting element to emit white light or the like without using the light source as in an organic EL display. If the white light leaks outside a device though a white glass housing, appearance is deteriorated. From this standpoint, it is preferred that the white glass housing has the characteristic of surely shielding white light. Furthermore, a white glass housing that does not have the characteristic of surely shielding white light may be semitransparent, and therefore can exert unique decorative effect having transparency feeling and soft feeling.

The reason why the white glass in the present invention is suitable for a housing is as follows. The white glass is a glass (phase separated glass) in which fine phase separation particles are precipitated in the inside of a glass, and has excellent mechanical strength and scratch resistance. Furthermore, phase separation particles in a glass diffuse, reflect and scatter light at their boundaries, and thus, an appearance shows white color. The white glass in the present invention makes it difficult to recognize white light passing through a glass (light from a light source of a display device) at a surface side of the glass utilizing scattering of light of the phase separated glass, or has designability.

In the white glass or strengthened white glass (hereinafter, the white glass and strengthened white glass are not distinguished to each other and are collectively called a white glass), a linear transmittance of light having a wavelength of 600 nm at a thickness of 1 mm of 50% or less. The strengthened white glass is obtained by chemically strengthening the white glass (for example, subjecting the white glass to an ion-exchanging treatment).

The total light reflectance $R_{600}$ of light having a wavelength of 600 nm of the white glass and strengthened white glass in the present invention is preferably 30% or more. In a case where the $R_{600}$ is less than 30%, light-shielding property may be insufficient, and the $R_{600}$ is typically 40% or more. In the evaluation of whiteness of the white glass utilizing whitening due to scattering phenomenon, considering that reflection due to the scattering phenomenon is monotonically decreased with a wavelength, the total light reflectance at 600 nm that is a central wavelength of a visible region is used.

Phase separation of a glass means that a single phase glass is separated into two ore more glass phases. Examples of the method for phase-separating a glass include a method of heat-treating a glass.

As heat treatment conditions for phase-separation of a glass, typically a temperature 50 to 400° C. higher than a glass transition point or annealing point is preferred. A temperature 100 to 300° C. higher than a glass transition point or annealing point is more preferred. Heat treatment time of a glass is preferably from 1 to 64 hours, and more preferably from 2 to 32 hours. From the standpoint of mass productivity, the heat treatment time is preferably 24 hours or less, and more preferably within 12 hours.

Whether or not a glass is phase-separated can be judged by SEM (scanning electron microscope). That is, in the case where a glass is phase-separated, separation into two or more phases can be observed by SEM The white glass obtained by heat-treating under the conditions within the above ranges is liable to be ion-exchanged, and appropriate light-shielding property is imparted to a housing by ion-exchanging the phase-separated glass, thereby obtaining high strength.

Phase separation may involve crystallization. There is a possibility that crystallization contributes to whitening. For this reason, a composite phase of phase separation+crystal phase is not particularly eliminated. However, it is not preferred that a glass crystallized to such an extent that strength is decreased, ion exchange temperature is decreased and ion exchange performance (compressive stress, stress layer thickness) is decreased. Volume of particles of crystal phase/(volume of particles of disperse phase+volume of crystal particles) is preferably 50% or less, more preferably 20% or less, still more preferably 10% or less, and still further more preferably 1% or less. In the white glass in the present invention, it is preferred that crystals are not precipitated. In a case where crystals are precipitated, ion exchange is liable to be disturbed. Alternatively, a glass may be difficult to be molded.

When a housing is constituted of a phase-separated glass having light-shielding property by whitening, light-shielding means is not required to be separately provided or cost for light-shielding means can be reduced, and a housing having a high light-shielding property and white appearance is obtained at low cost. Furthermore, a housing having design property is obtained.

Examples of the ion-exchange treatment include a method of dipping a glass in a molten salt. Ion-exchange treatment time is preferably from 1 to 72 hours, and more preferably from 2 to 24 hours. In order to improve productivity, the treatment time is preferably 12 hours or less. Examples of the molten salt include $KNO_3$. Specifically, it is typical that a glass is dipped in a $KNO_3$ molten salt of from 400 to 500° C. for from 1 to 72 hours.

In order to effectively achieve strength-enhancing effect by chemical strengthening, it is preferred that a surface compressive stress layer deeper than microcracks formed on the surface of a glass is present, and it is preferred that a depth of the surface compressive stress layer formed by chemical strengthening is 5 μm or more. Furthermore, occurrence of scratches exceeding a depth of the surface compressive stress layer during use leads to breakage of a glass. Therefore, a depth of the surface compressive stress layer is preferably large, more preferably 10 μm or more, still more preferably 20 μm or more, and typically 30 μm or more.

On the other hand, when a depth of the surface compressive stress layer is large, internal tensile stress is increased, and impact at the time of breaking is large. That is, it has been found that if internal tensile stress is large, when a glass breaks, there is a tendency that the glass breaks into pieces and the pieces scatter. In a glass having a thickness of 1 mm or less, when the depth of the surface compressive stress layer exceeds 70 μm, scattering at the time of breaking is remarkable.

Therefore, in the white glass in the present invention, a depth of the surface compressive stress layer is preferably 70 μm or less. It is assumed that, in the white glass for a housing in the present invention, depending on an electronic device to be externally mounted, for example, in the use of the white glass in a panel having high probability of occurrence of contact scratches on the surface thereof, the depth of the surface compressive stress layer should be decreased from the standpoint of safety. The depth is more preferably 60 μm or less, still more preferably 50 μm or less, and typically 40 μm or less.

In the strengthened white glass in the present invention, the surface compressive stress is preferably 300 MPa or more, and more preferably 400 MPa or more.

The surface compressive stress CS (unit: MPa) and the thickness of a compressive stress layer DOL (unit: μm) in the white glass in the present invention can be measured by measuring a birefringence if the glass has light transparency. Furthermore, the depth of the surface compressive stress layer can be measured using EPMA (electron probe micro analyzer) or the like.

The strengthened white glass in the present invention has the characteristic that mechanical strength and the like are excellent. For this reason, the strengthened white glass can be preferably used in a white glass housing of a portable electronic device such as a mobile phone that requires high strength to its housing.

The white glass in the present invention may be formed into not only a flat plate shape, but a concave shape or a convex shape. In this case, a glass molded in a flat plate or a block may be reheated and press-molded in a molten state. Furthermore, a glass may be molded into a desire shape by a direct press method such that a molten glass is directly flown on a press mold and then press-molded. A portion corresponding to a display device or connector of an electronic device may be processed simultaneously with press molding, or cutting or the like may be conducted after press molding.

The white glass in the present invention can be preferably used in a portable electronic device. The meaning of the portable electronic device includes, as a concept, a portable and usable communication device or information device.

Examples of the communication device include a mobile phone, PHS (Personal Handy-phone System), a smart phone, PDA (Personal Data Assist) and PND (Portable Navigation Device, portable car navigation system), as a communication terminal, and include a portable radio, a portable television and one-segment receiver, as a broadcasting receiver.

Examples of the information device include a digital camera, a video camera, a portable music player, a sound recorder, a portable DVD player, a portable game machine, a notebook computer, a tablet PC, an electronic dictionary, an electronic organizer, an electronic book leader, a portable printer and a portable scanner, but the information device is not limited to the exemplifications.

A portable electronic device having beauty can be obtained by using the white glass in the present invention in those portable electronic devices, and when the strengthened white glass in the present invention is used, the higher strength can be obtained.

The white glass in the present invention having high strength and beauty can be applied to electronic devices other than the portable electronic device (for example, a housing of a desktop personal computer), house appliances (for example, a large-sized television), building members, automotive members, tableware, lighting members (for example, a scatter plate), reflective members, architectures and the like. The white glass can be used in the contents of structures such as tunnel, as the reflective member.

In the housing for a portable electronic device in the present invention, a conductor pattern may be formed, and front and rear surfaces of the housing can be utilized as a formation part. Furthermore, the whole or a part of the conductor pattern may have a high frequency circuit function of an antenna, a filter or the like. In this case, the portable electronic device has any connecting means between a conductor pattern formed on the housing and a circuit in the electronic device. A cable, a flexible substrate, a pin using a spring, a contact by a mechanism having elasticity appropriately selected, and the like can be utilized as the connecting means.

Figure 2:
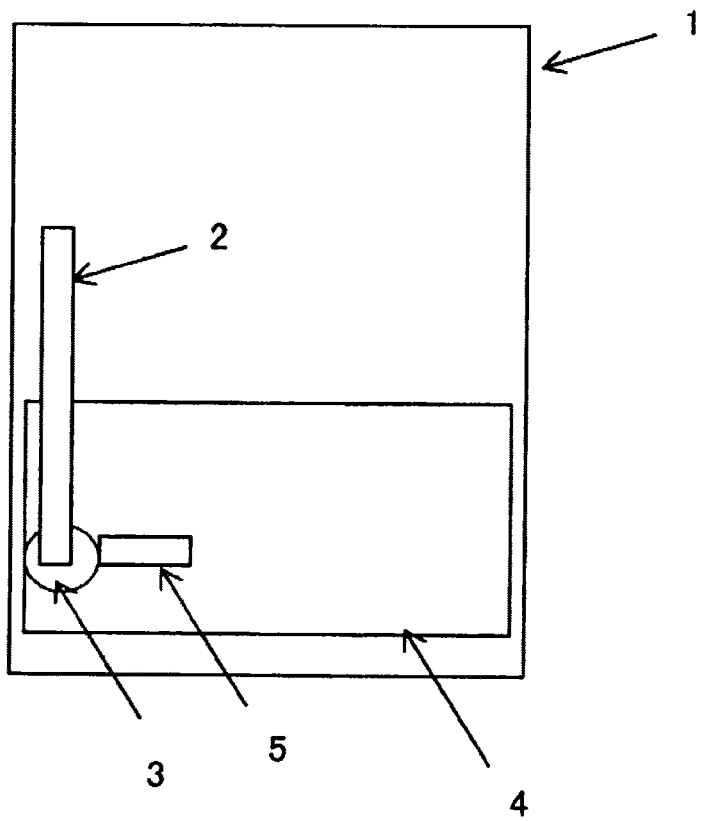
FIG. 2 is a conceptual view showing a planar structure of a portable electronic device.

As one example, a conceptual view showing a cross-sectional structure of a portable electronic device is shown in FIG. 1, and a conceptual view showing a planar structure of a portable electronic device is shown in FIG. 2. FIGS. 1 and 2 are an example showing a constitution having a housing 1, a conductor pattern 2 formed on the housing 1, a circuit board 4, a conductive pattern 5 formed on the circuit board 4, and a display 6, and further having a connecting means (spring pin) 3 between the conductor pattern 2 and the conductor pattern 5.

Compositions of the glass used in the present invention are described below. In the present specification, unless otherwise indicated, the content of glass components is indicated in terms of mole percentage.

In the present invention, $SiO_2$ is a basic component that forms a network structure of a glass. That is, $SiO_2$ constitutes an amorphous structure and develops excellent mechanical strength, weather resistance or luster as a glass. The content of $SiO_2$ is within a range of from 50 to 80%. In a case where the content is less than 50%, weather resistance or scratch resistance as a glass may be deteriorated. The content is typically 52% or more, preferably 55% or more, and more preferably 60% or more. On the other hand, in a case where the content exceeds 80%, a melting temperature of a glass is increased. The content is preferably 75% or less, more preferably 73% or less, and still more preferably 66% or less.

The content of $SiO_2$ may be within a range of from 66 to 72%, a range of 58% or more and less than 66%, or a range of from 60 to 73%.

The content of $Al_2O_3$ is from 0 to 10%. The content of $Al_2O_3$ being from 0 to 10% means that $Al_2O_3$ may not be contained, but when it is contained, the content is 10% or less (hereinafter the same). $Al_2O_3$ has the actions of improving chemical durability of a glass and decreasing a coefficient of thermal expansion, and additionally has the effect of giving a function of remarkably improving dispersion stability between $SiO_2$ and other components, thereby making a phase separation of a glass uniform. When $Al_2O_3$ is contained, the content is preferably 0.5% or more. In a case where the content is less than 0.5%, the effect is small. The content is preferably 1% or more. In a case where the content exceeds 10%, a melting temperature of a glass is increased or a phase separation is difficult to be generated, and a linear transmittance is increased. The content is preferably 8% or less, more preferably 6% or less, still more preferably 5% or less, and most preferably 4% or less. In the case where chemical strengthening characteristics are desired to be improved by ion exchange, the content is preferably 2% or more, and more preferably 3% or more.

The content of MgO is from 11 to 30%. MgO has the effect of decreasing a coefficient of thermal expansion of a glass, and making easy to accelerate phase separation coupled with $SiO_2$ and $Na_2O$, thereby improving whiteness, and is an essential component. In a case where the content is less than 11%, whiteness is insufficient. The content is preferably 13% or more, more preferably 15% or more, and still more preferably 16% or more. In a case where the content exceeds 30%, whiteness may be rather decreased. The content is preferably 27% or less, more preferably 25% or less, and still more preferably 24% or less. In the case where chemical strengthening characteristics by ion exchange are desired to be improved, the content is preferably 25% or less, more preferably 23% or less, and typically 18% or less.

It is preferred that MgO is contained in an amount exceeding 10% in terms of mass percentage. When MgO is contained in an amount exceeding 10%, meltability can be improved. The content of MgO is preferably 12% or more.

$MgO/SiO_2$ which is a ratio of the content of MgO to the content of $SiO_2$ is preferably 0.45 or less. The ratio is preferably 0.14 or more. When $MgO/SiO_2$ is 0.14 or more and 0.45 or less, it has the effect of further accelerating phase separation, thereby improving whiteness. The ratio is preferably 0.4 or less and 0.15 or more.

The content of $Na_2O$ is from 0 to 15%. The presence of $Na_2O$ is preferred in that meltability of a glass is improved. In the case of conducting chemical strengthening, it is preferred to contain $Na_2O$. In the case of containing $Na_2O$, the content is preferably 1% or more. The content of less than 1% is poor in the effect of its presence. The content is preferably 2% or more, and more preferably 4% or more. On the other hand, in a case where the content exceeds 15%, weather resistance of a glass may be deteriorated and whiteness may be decreased. The content is preferably 14% or less, and more preferably 13% or less. In the case where it is desired to have whiteness, the content is 12% or less, preferably 11% or less, and more preferably 10% or less. In the case where it is desired to increase strength of a glass by an ion-exchange treatment, the content of $Na_2O$ is preferably 1.5% or more, and more preferably 6% or more. In a case where the content is less than 1.5%, it may be difficult to form desired surface compressive stress in the case of conducting ion exchange. The content is particularly preferably 8% or more, and typically 9% or more.

$P_2O_5$ is a basic component that accelerates phase separation coupled with $SiO_2$, MgO and $Na_2O$ and remarkably accelerates whitening of a glass. In the present invention, it is essential to contain $P_2O_5$ in an amount of from 0.5 to 15%. In a case where the content of $P_2O_5$ is less than 0.5%, whiteness of a glass is insufficient. The content is preferably 1% or more, more preferably 3% or more, and still more preferably 4% or more. On the other hand, in a case where the content exceeds 15%, volatilization is liable to occur, unevenness of white is increased, and the beauty of a glass may be impaired. The content is preferably 14% or less, more preferably 10% or less, still more preferably 7% or less, and still further more preferably 4.5% or less.

When the content of $SiO_2$ is from 66 to 72%, it is preferred that the content of $Al_2O_3$ is from 0 to 4%, the content of MgO is from 16 to 24% and the content of $Na_2O$ is from 4 to 10%.

When the content of $SiO_2$ is 58% or more and less than 66%, it is preferred that the content of $Al_2O_3$ is from 2 to 6%, the content of MgO is from 11 to 18%, the content of $Na_2O$ is from 8 to 13% and the content of $P_2O_5$ is from 3 to 7%.

When the content of $SiO_2$ is from 60 to 73%, it is preferred that the content of $Al_2O_3$ is from 0 to 5%, the content of MgO is from 13 to 30%, the content of $Na_2O$ is from 0 to 13% and the content of $P_2O_5$ is from 0.5 to 4.5%.

In the glass used in the present invention, there is a case where it is preferred to contain the following components, other than the above-described five components. Even in this case, the total of the contents of the above five components is preferably 90% or more, and typically 94% or more.

$ZrO_2$ is not an essential component, but may be contained in an amount of up to 4.5% in order to remarkably improve chemical durability. In a case where the content exceeds 4.5%, whiteness may be deteriorated. The content is preferably 4% or less, and more preferably 3% or less.

CaO, SrO and BaO each are not essential components, but it is preferred to contain at least one of those components in an amount of 0.2% or more in order to increase whiteness. The content is preferably 0.5% or more, and more preferably 1% or more.

When CaO is contained, its content is preferably 3% or less. In a case where the content exceeds 3%, devitrification is liable to occur, or ion-exchange may be difficult to be conducted.

The total of the contents of CaO, SrO and BaO is preferably 12% or less. In a case where the total content exceeds 12%, devitrification is liable to occur, or ion-exchange may be difficult to be conducted. The total content is more preferably 8% or less, 6% or less, 4% of less, and typically 3% or less.

$B_2O_3$ is not an essential component, but may be contained in an amount of up to 9% in order to increase meltability of a glass, and additionally improve whiteness of a glass, decrease a coefficient of thermal expansion and improve weather resistance. In a case where the content exceeds 9%, uneven whiteness may occur. The content is preferably 6% or less, more preferably 4% or less, and particularly preferably 3% or less.

$La_2O_3$ is preferred in improving whiteness of a glass, and can be contained in an amount of from 0 to 5%. In a case where $La_2O_3$ is contained in an amount exceeding 5%, a glass may be brittle. The content is preferably 3% or less, and more preferably 2% or less.

The glass used in the present invention may contain other components other than the above-described components, in a range that the object of the present invention is not impaired. For example, Co, Mn, Fe, Ni, Cu, Cr, V, Zn, Bi, Er, Tm, Nd, Sm, Sn, Ce, Pr, Eu, Ag or Au may be contained as a coloring component. In this case, the total of those coloring components is typically 5% or less in terms of mole percentage on the basis of oxides of minimum number of valence.

Linear transmittance to light having a wavelength of 600 nm in the white glass having a thickness of 1 mm in the present invention is preferably 50% or less. In a case where the linear transmittance exceeds 50%, desired hiding property or light shielding property is not obtained. The linear transmittance is preferably 45% or less, more preferably 40% or less, still more preferably 30% or less, and most preferably 20% or less. In order to increase light shielding property, linear transmittance at a wavelength of 400 nm at a thickness of 1 mm, linear transmittance at a wavelength of 600 nm at a thickness of 1 mm and linear transmittance at a wavelength of 800 nm at a thickness of 1 mm are all preferably 20% or less, more preferably 10% or less, and still more preferably 5% or less. Those linear transmittances are obtained by general transmittance measurement.

EXAMPLES

Glass raw materials generally used such as an oxide, a hydroxide, a carbonate, a sulfate and the like were appropriately selected so as to be compositions in terms of mol % shown in the columns of from $SiO_2$ to $P_2O_5$ of Examples 1-1 to 21-2 and Examples 26 to 51 in Tables 1 to 10, followed by weighing so as to be 400 g as a glass, and they were mixed. The resulting mixture was placed in a platinum crucible, and the platinum crucible was placed in a resistance heating electric furnace of 1,600° C. or 1,650° C. and the mixture was molten for 3 hours, followed by defoaming and homogenizing. The resulting melt was flown in a mold material, maintained at a temperature of from 650 to 730° C. (shown as unit ° C. in the column of $T_A$ in the Tables) for 1 hour, and then cooled to room temperature at a cooling rate of 1° C. per minute, thereby obtaining glasses (untreated glasses) in those Examples. For example, in Examples 3-1, 3-2, 3-3 and 3-4, those are distinguished such that heat treatment conditions described hereinafter differ (including the case that heat treatment is not conducted), although the glass itself is the same, and in Examples 2, 3-1, 15-1, 17-1, 18-1, 19, 20, 21-1, 30-1, 32-1, 33-1, 34-1, 35-1, 36-1, 37-1, 38-1, 39-1, 40-1, 41-1, 42-1, 43-1, 44-1 and 45 to 49, untreated glasses were already white glasses. Examples 26 to 29 are comparative examples. In Examples 23 to 25, 50 and 51, estimated values are shown.

In the Tables, Mg/Si is a molar ratio of MgO to $SiO_2$ in each glass, AP is an estimated value (an error is ±50° C.) of an annealing point (unit: ° C.) of each glass, and * attached before the numerical value shows that the data are estimated values.

Next, those glasses were subjected to a heat treatment of maintaining at a heat treatment temperature (unit: ° C.) shown in the column of θ in Tables 1 to 9 for a heat treatment time (unit: time) shown in the column of τ in the Tables, and then cooled to room temperature. Thus, white glasses were prepared. Heating up to θ during heat-treating and cooling from θ were conducted at a rate of 5° C. per minute. The white glasses obtained were observed with SEM. As a result, each glass was in a phase-separated state. Furthermore, the glasses in Examples 1-2, 2, 17-1, 17-2, 17-3, and 30-1 to 44-2 were examined with X-ray diffractometry. As a result, crystal precipitation was not recognized.

The examples in which the indications "–" is described in the columns of θ and τ in Tables 1 to 10 are Examples in which the heat treatment was not conducted, but whitening already occurred in the course of preparing a glass as described above, and low linear transmittance was obtained.

Regarding the white glasses obtained, linear transmittances $T_{400}$, $T_{600}$ and $T_{800}$ (unit: %) of light having wavelengths of 400 nm, 600 nm and 800 nm at a thickness of 1 mm were measured in the following manner. The results are shown in the corresponding columns in Tables 1 to 10. Examples 1-1 to 21-2 and 30-1 to 49 are invention examples and Examples 26 to 29 are comparative examples. Examples 23 to 25, Example 50 and Example 51 are examples obtained by calculation.

$T_{400}$, $T_{600}$ and $T_{800}$: A sample of about 20 mm×about 20 mm×about 1 mm thickness in which upper and lower surfaces were mirror polished was prepared, a spectral transmittance curve in a wavelength of from 400 to 800 nm was obtained using a spectrophotometer U-4100 manufactured by Hitachi, and linear transmittances of light having wavelengths of 400, 600 and 800 nm at a thickness of 1 mm were obtained.

Regarding the whitened sample, the sample was chemically strengthened by ion-exchanging in 100% $KNO_3$ molten salt under the conditions shown in the columns below the column of $T_{400}$ in Tables 1 to 10, and a surface compressive stress value CS (unit: MPa) and a depth of a compressive stress layer DOL (unit: μm) were measured with a surface stress meter (FSM-6000) manufactured by Orihara Manufacturing Co., Ltd. The results are shown in Tables 1 to 10.

For example, the indication of "400° C., 13 h" in the leftmost column in each Table indicates the ion exchange treatment condition that the sample is dipped in the molten salt at 400° C. for 13 hours. Furthermore, for example, the indication of "428/7" in the column of "450° C., 92 h" of Example 1-2 indicates that as a result of conducting the ion exchange treatment at 450° C. for 92 hours, CS is 428 MPa and DOL is 7 μm. The whitened glass of Example 40-2 having been subjected to the ion exchange at 450° C. for 6 hours did not have optical transparency, and therefore, the measurement of CS and DOL by a surface stress meter could not be conducted. However, as a result of measurement of K concentration profile on the surface of the white glass using EPMA, DOL was 22 μm.

As shown in Tables 1 to 10, it was found that in the examples satisfying the requirements of the present invention, the glass that was whitened to have low linear transmittance, and additionally was chemically strengthened to have improved strength can be obtained.

Sand was sandwiched between ABS resin and the white glass or strengthened white glass of the present invention in Examples 1-2, 8-1, 12-3 and 18-2, and was rubbed. As a result, scratches were visually observed on the ABS resin, but remarkable scratches were not confirmed in the cases of examples of the present invention. The same results are obtained in other examples of the present invention.

Total light reflectance $R_{600}$ (unit: %) of light having a wavelength of 600 nm was measured using a spectrophotometer (Lamda 950) manufactured by PerkinElmer Co., Ltd. The results are shown in the Tables. All of $R_{600}$ is 30% or more.

Furthermore, regarding Example 1-2, Example 27, Example 30-2, Example 33-1 and Example 33-2, total light reflectance $R_{400}$ (unit: %) of light having a wavelength of 400 nm was measured. The measurement results were 75%, 57%, 57%, 62% and 62%, respectively. Regarding the examples obtained by calculation, $R_{600}$ is indicated in one significant digit in the Tables.

TABLE 1

| Ex. | 1-1 | 1-2 | 2 | 3-1 | 3-2 | 3-3 | 3-4 | 4-1 | 4-2 | 4-3 |
|---|---|---|---|---|---|---|---|---|---|---|
| $SiO_2$ | 71.2 | 71.2 | 69.6 | 69.9 | 69.9 | 69.9 | 69.9 | 70.9 | 70.9 | 70.9 |
| $Al_2O_3$ | 0 | 0 | 0 | 1.0 | 1.0 | 1.0 | 1.0 | 0 | 0 | 0 |
| MgO | 22.8 | 22.8 | 22.3 | 22.3 | 22.3 | 22.3 | 22.3 | 22.7 | 22.7 | 22.7 |
| $ZrO_2$ | 0 | 0 | 0 | 0 | 0 | 0 | 0 | 0 | 0 | 0 |
| $Na_2O$ | 5.0 | 5.0 | 4.9 | 4.9 | 4.9 | 4.9 | 4.9 | 4.9 | 4.9 | 4.9 |
| $La_2O_3$ | 0 | 0 | 0 | 0 | 0 | 0 | 0 | 0.5 | 0.5 | 0.5 |
| $P_2O_5$ | 1.0 | 1.0 | 2.9 | 1.9 | 1.9 | 1.9 | 1.9 | 1.0 | 1.0 | 1.0 |
| Mg/Si | 0.32 | 0.32 | 0.32 | 0.32 | 0.32 | 0.32 | 0.32 | 0.32 | 0.32 | 0.32 |
| AP | *690 | *690 | *650 | *680 | *680 | *680 | *680 | *680 | *680 | *680 |
| $T_A$ | 730 | 730 | 700 | 730 | 730 | 730 | 730 | 730 | 730 | 730 |
| θ | 850 | 900 | — | — | 800 | 850 | 900 | 800 | 850 | 900 |
| τ | 4 | 4 | — | — | 4 | 4 | 4 | 4 | 4 | 4 |
| $R_{600}$ | *50 | 67.0 | *70 | *70 | *70 | *70 | *70 | *30 | *60 | *70 |
| $T_{800}$ | 76.0 | 14.4 | 0.4 | 7.9 | 12.9 | 5.4 | 1.3 | 85.1 | 69.6 | 6.4 |
| $T_{600}$ | 23.8 | 0.8 | 0.3 | 0.5 | 0.7 | 0.4 | 0.3 | 44.6 | 13.4 | 0.4 |
| $T_{400}$ | 0.3 | 0.3 | 0.3 | 0.2 | 0.2 | 0.2 | 0.2 | 0.4 | 0.2 | 0.2 |
| 400° C., 13 h | | | | 230/7 | | 233/8 | 240/8 | | | |
| 450° C., 6 h | | | *400/2 | 371/27 | 358/25 | | 362/23 | | | |
| 450° C., 92 h | | 428/7 | *400/5 | | | | | | | |
| 500° C., 19 h | | 458/6 | | 402/25 | | 346/24 | 381/15 | | | |
| 500° C., 63 h | | | | | | | | 446/10 | 439/10 | 469/9 |

TABLE 2

| Ex. | 5 | 6 | 7 | 8-1 | 8-2 | 8-3 | 9 |
|---|---|---|---|---|---|---|---|
| $SiO_2$ | 69.3 | 67.9 | 68.2 | 67.4 | 67.4 | 67.4 | 66.0 |
| $Al_2O_3$ | 1.0 | 1.9 | 1.0 | 1.9 | 1.9 | 1.9 | 1.8 |
| MgO | 20.8 | 17.0 | 20.5 | 16.8 | 16.8 | 16.8 | 16.5 |

TABLE 2-continued

| Ex. | 5 | 6 | 7 | 8-1 | 8-2 | 8-3 | 9 |
|---|---|---|---|---|---|---|---|
| $ZrO_2$ | 1.0 | 0 | 2.4 | 0.9 | 0.9 | 0.9 | 2.8 |
| $Na_2O$ | 5.9 | 9.4 | 5.9 | 9.3 | 9.3 | 9.3 | 9.2 |
| $P_2O_5$ | 2.0 | 3.8 | 2.0 | 3.7 | 3.7 | 3.7 | 3.7 |
| Mg/Si | 0.30 | 0.25 | 0.30 | 0.25 | 0.25 | 0.25 | 0.25 |
| AP | *670 | *590 | *690 | *620 | *620 | *620 | *640 |
| $T_A$ | 720 | 640 | 740 | 670 | 670 | 670 | 690 |
| θ | 900 | 850 | 900 | 900 | 900 | 900 | 900 |
| τ | 4 | 4 | 4 | 4 | 8 | 32 | 32 |
| $R_{600}$ | *70 | *70 | *70 | *30 | *40 | *50 | *40 |
| $T_{800}$ | 14.2 | 13.2 | 17.5 | 81.7 | 72.4 | 52.5 | 67.7 |
| $T_{600}$ | 1.2 | 2.5 | 1.4 | 49.3 | 36.5 | 22.7 | 37.3 |
| $T_{400}$ | 0.3 | 0.4 | 0.3 | 7.9 | 4.9 | 1.8 | 6.8 |
| 450° C., 6 h |  | 562/17 |  | 586/20 | 630/19 | 622/19 | 700/20 |
| 450° C., 19 h | 441/16 |  | 454/16 |  |  |  |  |
| 500° C., 63 h | 448/50 |  |  |  |  |  |  |

TABLE 3

| Ex. | 10-1 | 10-2 | 10-3 | 10-4 | 10-5 | 11-1 | 11-2 | 11-3 | 11-4 |
|---|---|---|---|---|---|---|---|---|---|
| $SiO_2$ | 66.6 | 66.6 | 66.6 | 66.6 | 66.6 | 65.5 | 65.5 | 65.5 | 65.5 |
| $Al_2O_3$ | 2.8 | 2.8 | 2.8 | 2.8 | 2.8 | 1.8 | 1.8 | 1.8 | 1.8 |
| MgO | 16.7 | 16.7 | 16.7 | 16.7 | 16.7 | 16.4 | 16.4 | 16.4 | 16.4 |
| $ZrO_2$ | 0.9 | 0.9 | 0.9 | 0.9 | 0.9 | 2.7 | 2.7 | 2.7 | 2.7 |
| $Na_2O$ | 9.3 | 9.3 | 9.3 | 9.3 | 9.3 | 9.1 | 9.1 | 9.1 | 9.1 |
| $P_2O_5$ | 3.7 | 3.7 | 3.7 | 3.7 | 3.7 | 4.5 | 4.5 | 4.5 | 4.5 |
| Mg/Si | 0.25 | 0.25 | 0.25 | 0.25 | 0.25 | 0.25 | 0.25 | 0.25 | 0.25 |
| AP | *630 | *630 | *630 | *630 | *630 | *630 | *630 | *630 | *630 |
| $T_A$ | 680 | 680 | 680 | 680 | 680 | 680 | 680 | 680 | 680 |
| θ | 850 | 900 | 900 | 950 | 950 | 900 | 900 | 950 | 950 |
| τ | 4 | 4 | 32 | 4 | 32 | 4 | 32 | 4 | 32 |
| $R_{600}$ | *30 | *40 | *60 | *50 | *60 | *40 | *50 | *50 | *60 |
| $T_{800}$ | 83.7 | 79.6 | 49.2 | 66.5 | 29.9 | 66.3 | 47.5 | 64.2 | 39.4 |
| $T_{600}$ | 48.9 | 40.6 | 16.0 | 26.2 | 8.3 | 31.9 | 21.5 | 30.0 | 15.8 |
| $T_{400}$ | 5.1 | 3.9 | 0.8 | 2.0 | 0.5 | 5.0 | 1.8 | 4.2 | 1.0 |
| 450° C., 6 h | 630/24 | 629/24 | 649/24 | 629/24 | 650/24 | 690/19 | 684/18 | 679/18 | 657/19 |

TABLE 4

| Ex. | 12-1 | 12-2 | 12-3 | 12-4 | 12-5 | 13 | 14 | 15-1 | 15-2 | 15-3 |
|---|---|---|---|---|---|---|---|---|---|---|
| $SiO_2$ | 66.0 | 66.0 | 66.0 | 66.0 | 66.0 | 66.6 | 66.6 | 66.1 | 66.1 | 66.1 |
| $Al_2O_3$ | 3.7 | 3.7 | 3.7 | 3.7 | 3.7 | 1.9 | 1.9 | 1.8 | 1.8 | 1.8 |
| MgO | 16.5 | 16.5 | 16.5 | 16.5 | 16.5 | 18.5 | 16.7 | 16.5 | 16.5 | 16.5 |
| $ZrO_2$ | 0.9 | 0.9 | 0.9 | 0.9 | 0.9 | 0 | 0 | 0.9 | 0.9 | 0.9 |
| $Na_2O$ | 9.2 | 9.2 | 9.2 | 9.2 | 9.2 | 9.3 | 11.1 | 9.2 | 9.2 | 9.2 |
| $P_2O_5$ | 3.7 | 3.7 | 3.7 | 3.7 | 3.7 | 3.7 | 3.7 | 5.5 | 5.5 | 5.5 |
| Mg/Si | 0.25 | 0.25 | 0.25 | 0.25 | 0.25 | 0.28 | 0.25 | 0.25 | 0.25 | 0.25 |
| AP | *650 | *650 | *650 | *650 | *650 | *610 | *580 | *620 | *620 | *620 |
| $T_A$ | 700 | 700 | 700 | 700 | 700 | 650 | 630 | 670 | 670 | 670 |
| θ | 850 | 900 | 900 | 950 | 950 | 900 | 900 | — | 900 | 950 |
| τ | 4 | 4 | 32 | 4 | 32 | 4 | 4 | — | 4 | 4 |
| $R_{600}$ | *40 | *50 | *60 | *50 | *60 | *40 | *70 | *60 | *70 | *70 |
| $T_{800}$ | 76.3 | 74.6 | 44.0 | 66.0 | 24.6 | 79.0 | 11.5 | 23.1 | 0.4 | 0.4 |
| $T_{600}$ | 31.5 | 29.0 | 10.5 | 21.1 | 5.0 | 40.2 | 1.4 | 5.6 | 0.3 | 0.3 |
| $T_{400}$ | 1.6 | 1.5 | 2.8 | 1.0 | 0.4 | 4.1 | 0.4 | 0.4 | 0.2 | 0.3 |
| 400° C., 12 h |  |  |  |  |  | 582/14 | 565/22 |  |  |  |
| 450° C., 6 h | 641/28 | 636/28 | 655/28 | 645/28 | 652/28 | 576/19 | 480/29 | 581/22 | *550/20 | *550/20 |

TABLE 5

| Ex. | 16 | 17-1 | 17-2 | 17-3 | 18-1 | 18-2 | 18-3 | 19 | 20 | 21-1 | 21-2 |
|---|---|---|---|---|---|---|---|---|---|---|---|
| $SiO_2$ | 64.9 | 63.8 | 63.8 | 63.8 | 63.1 | 63.1 | 63.1 | 69.9 | 68.7 | 62.1 | 62.1 |
| $Al_2O_3$ | 1.8 | 1.8 | 1.8 | 1.8 | 1.8 | 1.8 | 1.8 | 0 | 0 | 3.4 | 3.4 |

TABLE 5-continued

| Ex. | 16 | 17-1 | 17-2 | 17-3 | 18-1 | 18-2 | 18-3 | 19 | 20 | 21-1 | 21-2 |
|---|---|---|---|---|---|---|---|---|---|---|---|
| $B_2O_3$ | 0 | 0 | 0 | 0 | 0 | 0 | 0 | 1.9 | 3.8 | 0 | 0 |
| MgO | 16.2 | 15.9 | 15.9 | 15.9 | 15.8 | 15.8 | 15.8 | 22.3 | 21.9 | 15.5 | 15.5 |
| $ZrO_2$ | 2.7 | 4.4 | 4.4 | 4.4 | 4.4 | 4.4 | 4.4 | 0 | 0 | 4.3 | 4.3 |
| $Na_2O$ | 9.0 | 8.8 | 8.8 | 8.8 | 8.8 | 8.8 | 8.8 | 4.9 | 4.8 | 9.5 | 9.5 |
| $P_2O_5$ | 5.4 | 5.3 | 5.3 | 5.3 | 6.1 | 6.1 | 6.1 | 1.0 | 1.0 | 5.2 | 5.2 |
| Mg/Si | 0.25 | 0.25 | 0.25 | 0.25 | 0.25 | 0.25 | 0.25 | 0.32 | 0.32 | 0.25 | 0.25 |
| AP | *650 | *700 | *700 | *700 | *690 | *690 | *690 | *630 | *610 | *690 | *690 |
| $T_A$ | 700 | 750 | 750 | 750 | 740 | 740 | 740 | 680 | 660 | 740 | 740 |
| θ | 900 | — | 900 | 950 | — | 900 | 950 | — | — | — | 900 |
| τ | 32 | — | 4 | 4 | — | 4 | 4 | — | — | — | 4 |
| $R_{600}$ | *60 | *50 | *50 | *50 | *70 | *70 | *70 | *70 | *70 | *50 | *60 |
| $T_{800}$ | 34.3 | 52.4 | 51.2 | 51.8 | 12.7 | 3.1 | 2.0 | 20.3 | 0.6 | 59.6 | 38.8 |
| $T_{600}$ | 12.8 | 26.7 | 27.8 | 27.7 | 1.6 | 0.5 | 0.4 | 0.6 | 0.2 | 25.8 | 8.8 |
| $T_{400}$ | 0.7 | 3.2 | 3.5 | 3.6 | 0.4 | 0.3 | 0.2 | 0.2 | 0.2 | 3.0 | 0.4 |
| 400° C., 12 h | | | | | 649/15 | 599/15 | 535/16 | | | | |
| 450° C., 6 h | 620/20 | 734/16 | 718/18 | 725/18 | 684/18 | 631/18 | 632/18 | | | 806/24 | 789/25 |
| 450° C., 108 h | | | | | | | | 441/5 | *400/3 | | |

TABLE 6

| Ex. | 23 | 24 | 25 | 26 | 27 | 28 | 29 |
|---|---|---|---|---|---|---|---|
| $SiO_2$ | 71.2 | 55 | 80 | 72.0 | 72.0 | 71.7 | 70.5 |
| $Al_2O_3$ | 0 | 0 | 0 | 0 | 0 | 4.6 | 4.5 |
| MgO | 28.3 | 30 | 11 | 23.0 | 23.0 | 6.7 | 6.6 |
| $TiO_2$ | 0 | 0 | 0 | 0 | 0 | 1.0 | 2.8 |
| $Na_2O$ | 0 | 0 | 0 | 5.0 | 5.0 | 13.1 | 12.8 |
| $P_2O_5$ | 0.5 | 15 | 9 | 0 | 0 | 2.9 | 2.8 |
| Mg/Si | 0.40 | 0.55 | 0.14 | 0.32 | 0.32 | 0.09 | 0.09 |
| AP | *700 | *600 | *750 | *710 | *710 | *580 | *620 |
| $T_A$ | *750 | *650 | *800 | 760 | 760 | 630 | 670 |
| θ | 900 | 900 | 900 | 850 | 900 | 900 | 900 |
| τ | 4 | 4 | 4 | 4 | 4 | 4 | 4 |
| $R_{600}$ | *60 | *60 | *50 | *10 | 28 | *10 | *10 |
| $T_{800}$ | | | | 90.8 | 81.3 | 92.2 | 90.8 |
| $T_{600}$ | *10 | *15 | *30 | 87.4 | 52.2 | 91.7 | 85.2 |
| $T_{400}$ | | | | 55.5 | 5.3 | 86.7 | 54.1 |
| 400° C., 12 h | | | | | | 473/51 | 554/43 |
| 450° C., 6 h | | | | | 437/7 | | |

TABLE 7

| Ex. | 30-1 | 30-2 | 30-3 | 31 | 32-1 | 32-2 | 33-1 | 33-2 | 34-1 | 34-2 | 35-1 |
|---|---|---|---|---|---|---|---|---|---|---|---|
| $SiO_2$ | 59.7 | 59.7 | 59.7 | 57.3 | 60.7 | 60.7 | 56.8 | 56.8 | 54.3 | 54.3 | 53.4 |
| $Al_2O_3$ | 3.3 | 3.3 | 3.3 | 3.2 | 3.4 | 3.4 | 5.0 | 5.0 | 4.8 | 4.8 | 4.8 |
| $B_2O_3$ | 3.9 | 3.9 | 3.9 | 3.7 | 3.9 | 3.9 | 3.9 | 3.9 | 8.1 | 8.1 | 8.1 |
| MgO | 14.9 | 14.9 | 14.9 | 14.3 | 15.2 | 15.2 | 14.9 | 14.9 | 14.4 | 14.4 | 14.4 |
| $ZrO_2$ | 4.1 | 4.1 | 4.1 | 4.0 | 2.5 | 2.5 | 2.5 | 2.5 | 2.4 | 2.4 | 2.4 |
| $Na_2O$ | 9.1 | 9.1 | 9.1 | 12.7 | 9.3 | 9.3 | 11.1 | 11.1 | 10.7 | 10.7 | 11.6 |
| $P_2O_5$ | 5.0 | 5.0 | 5.0 | 4.8 | 5.1 | 5.1 | 5.9 | 5.9 | 5.3 | 5.3 | 5.3 |
| Mg/Si | 0.25 | 0.25 | 0.25 | 0.25 | 0.25 | 0.25 | 0.26 | 0.26 | 0.27 | 0.27 | 0.27 |
| AP | *650 | *650 | *650 | *600 | *610 | *610 | *610 | *610 | *580 | *580 | *580 |
| $T_A$ | 680 | 680 | 680 | 630 | 640 | 640 | 640 | 640 | 610 | 610 | 610 |
| θ | — | 900 | 950 | 900 | — | 900 | — | 900 | — | 900 | — |
| τ | — | 4 | 4 | 4 | — | 4 | — | 4 | — | 4 | — |
| $R_{600}$ | *50 | 50 | *60 | *20 | *60 | *60 | 53 | 54 | *60 | *70 | *40 |
| $T_{800}$ | 32.6 | 28.0 | 23.5 | 66.8 | 20.4 | 18.1 | 26.7 | 24.4 | 18.9 | 10.9 | 41.9 |
| $T_{600}$ | 7.6 | 6.7 | 5.3 | 44.6 | 4.3 | 3.5 | 6.9 | 6.1 | 3.3 | 1.3 | 11.9 |
| $T_{400}$ | 0.4 | 0.4 | 0.4 | 15.0 | 0.4 | 0.4 | 0.4 | 0.4 | 0.4 | 0.4 | 0.6 |
| 400° C., 6 h | 679/12 | 664/12 | 656/12 | | | | | | | | |
| 450° C., 6 h | 701/21 | 692/21 | 690/22 | 881/18 | 652/22 | 644/24 | 745/30 | 731/31 | 623/22 | 635/23 | 623/22 |

TABLE 8

| Ex. | 35-2 | 36-1 | 36-2 | 37-1 | 37-2 | 38-1 | 38-2 | 39-1 | 39-2 | 40-1 | 40-2 |
|---|---|---|---|---|---|---|---|---|---|---|---|
| $SiO_2$ | 53.4 | 56.2 | 56.2 | 61.7 | 61.7 | 60.7 | 60.7 | 60.7 | 60.7 | 60.7 | 60.7 |
| $Al_2O_3$ | 4.8 | 2.9 | 2.9 | 3.4 | 3.4 | 3.4 | 3.4 | 3.4 | 3.4 | 3.4 | 3.4 |
| $B_2O_3$ | 8.1 | 8.1 | 8.1 | 3.9 | 3.9 | 3.9 | 3.9 | 3.9 | 3.9 | 3.9 | 3.9 |
| MgO | 14.4 | 14.4 | 14.4 | 15.2 | 15.2 | 15.2 | 15.2 | 13.2 | 13.2 | 13.2 | 13.2 |
| CaO | 0.0 | 0.0 | 0.0 | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 2.0 | 2.0 | 0.0 | 0.0 |
| $ZrO_2$ | 2.4 | 1.5 | 1.5 | 2.5 | 2.5 | 1.5 | 1.5 | 2.5 | 2.5 | 2.5 | 2.5 |
| $Na_2O$ | 11.6 | 11.6 | 11.6 | 9.3 | 9.3 | 10.3 | 10.3 | 9.3 | 9.3 | 9.3 | 9.3 |
| $P_2O_5$ | 5.3 | 5.3 | 5.3 | 4.1 | 4.1 | 5.1 | 5.1 | 5.1 | 5.1 | 5.1 | 5.1 |
| Mg/Si | 0.27 | 0.26 | 0.26 | 0.25 | 0.25 | 0.25 | 0.25 | 0.22 | 0.22 | 0.22 | 0.22 |
| AP | *580 | *570 | *570 | *610 | *610 | *590 | *590 | *620 | *620 | *610 | *610 |

TABLE 8-continued

| Ex. | 35-2 | 36-1 | 36-2 | 37-1 | 37-2 | 38-1 | 38-2 | 39-1 | 39-2 | 40-1 | 40-2 |
|---|---|---|---|---|---|---|---|---|---|---|---|
| $T_A$ | 610 | 600 | 600 | 640 | 640 | 620 | 620 | 650 | 650 | 640 | 640 |
| θ | 900 | — | 900 | — | 900 | — | 900 | — | 900 | — | 900 |
| τ | 4 | — | 4 | — | 4 | — | 4 | — | 4 | — | 4 |
| $R_{600}$ | *60 | *40 | *70 | *30 | *40 | *40 | *40 | *60 | *60 | *70 | *70 |
| $T_{800}$ | 22.6 | 31.2 | 0.7 | 53.5 | 41.7 | 28.6 | 31.4 | 9.4 | 8.1 | 6.0 | 2.8 |
| $T_{600}$ | 4.9 | 9.7 | 0.5 | 15.4 | 10.0 | 8.2 | 8.9 | 1.0 | 0.9 | 0.6 | 0.4 |
| $T_{400}$ | 0.4 | 0.5 | 0.4 | 0.8 | 0.5 | 0.5 | 0.5 | 0.3 | 0.3 | 0.3 | 0.3 |
| 450° C., 6 h | 654/22 | 610/15 | 571/14 | 657/22 | 657/22 | 622/22 | 622/22 | 648/22 | 644/22 | 663/22 | |

TABLE 9

| Ex. | 41-1 | 41-2 | 42-1 | 42-2 | 43-1 | 43-2 | 44-1 | 44-2 |
|---|---|---|---|---|---|---|---|---|
| $SiO_2$ | 60.7 | 60.7 | 60.7 | 60.7 | 60.7 | 60.7 | 54.6 | 54.6 |
| $Al_2O_3$ | 3.4 | 3.4 | 4.4 | 4.4 | 4.9 | 4.9 | 3.4 | 3.4 |
| $B_2O_3$ | 3.9 | 3.9 | 3.9 | 3.9 | 3.9 | 3.9 | 4.9 | 4.9 |
| MgO | 13.2 | 13.2 | 15.2 | 15.2 | 15.2 | 15.2 | 11.0 | 11.0 |
| CaO | 0 | 0 | 0 | 0 | 0 | 0 | 3.0 | 3.0 |
| SrO | 2.0 | 2.0 | 0 | 0 | 0 | 0 | 2.0 | 2.0 |
| BaO | 0 | 0 | 0 | 0 | 0 | 0 | 4.9 | 4.9 |
| $ZrO_2$ | 2.5 | 2.5 | 0.5 | 0.5 | 0 | 0 | 1.0 | 1.0 |
| $Na_2O$ | 9.3 | 9.3 | 10.3 | 10.3 | 10.3 | 10.3 | 8.1 | 8.1 |
| $K_2O$ | 0 | 0 | 0 | 0 | 0 | 0 | 2.0 | 2.0 |
| $P_2O_5$ | 5.1 | 5.1 | 5.1 | 5.1 | 5.1 | 5.1 | 5.1 | 5.1 |
| Mg/Si | 0.22 | 0.22 | 0.25 | 0.25 | 0.25 | 0.25 | 0.20 | 0.20 |
| AP | *610 | *610 | *630 | *630 | *610 | *610 | *600 | *600 |
| $T_A$ | 640 | 640 | 596 | 596 | 583 | 583 | 650 | 650 |
| θ | — | 900 | — | 900 | — | 900 | — | 900 |
| τ | — | 4 | — | 4 | — | 4 | — | 4 |
| $R_{600}$ | *70 | *70 | *50 | *50 | *40 | *50 | 80 | 80 |
| $T_{800}$ | *7.7 | *5.0 | 15.8 | 15.4 | 20.5 | 17.0 | 0.5 | 0.3 |
| $T_{600}$ | *0.8 | *0.6 | 2.4 | 2.3 | 3.9 | 3.0 | 0.2 | 0.2 |
| $T_{400}$ | *0.3 | *0.3 | 0.3 | 0.3 | 0.4 | 0.4 | 0.1 | 0.1 |
| 450° C., 6 h | *655/22 | *650/22 | 609/30 | 574/33 | 605/28 | 592/30 | 654/22 | *650/22 |

TABLE 10

| Ex. | 45 | 46 | 47 | 48 | 49 | 50 | 51 |
|---|---|---|---|---|---|---|---|
| $SiO_2$ | 57.6 | 61.5 | 60.1 | 59.5 | 61.1 | 60.0 | 58.5 |
| $Al_2O_3$ | 3.4 | 7.0 | 3.4 | 3.4 | 3.4 | 9.0 | 8.0 |
| $B_2O_3$ | 1.9 | 0 | 1.9 | 0 | 1.9 | 3.0 | 5.0 |
| MgO | 15.2 | 12.0 | 15.2 | 15.2 | 15.2 | 11.0 | 12.0 |
| CaO | 0 | 0 | 0 | 0 | 0 | 0 | 0 |
| SrO | 0 | 0 | 0 | 0 | 0 | 0 | 0 |
| BaO | 0 | 0 | 0 | 0 | 0 | 0 | 0 |
| $ZrO_2$ | 2.5 | 0 | 0 | 2.5 | 0 | 0 | 0 |
| $Na_2O$ | 12.3 | 12.5 | 12.3 | 12.3 | 12.3 | 12.0 | 11.0 |
| $K_2O$ | 0 | 0 | 0 | 0 | 0 | 0 | 0 |
| $P_2O_5$ | 7.1 | 7.0 | 7.1 | 7.1 | 6.1 | 5.0 | 5.5 |
| Mg/Si | 0.26 | 0.20 | 0.25 | 0.26 | 0.20 | 0.20 | 0.20 |
| AP | *610 | *610 | *570 | *620 | *570 | *620 | *600 |
| $T_A$ | 636 | 642 | 636 | 636 | 636 | *648 | *627 |
| θ | — | — | — | — | — | — | — |
| τ | — | — | — | — | — | — | — |
| $R_{600}$ | *60 | *60 | *60 | *50 | *60 | *60 | *70 |
| $T_{800}$ | 28.1 | 53.2 | 34.4 | 50.5 | 37.6 | *26.0 | *20.0 |
| $T_{600}$ | 7.0 | 17.8 | 10.4 | 23.3 | 14.4 | *7.0 | *4.0 |
| $T_{400}$ | 0.4 | 0.8 | 0.5 | 1.7 | 0.7 | *0.4 | *0.4 |
| 450° C., 6 h | 683/30 | 660/74 | 633/28 | 815/32 | 565/31 | *750/49 | *597/45 |

While the invention has been described in detail and with reference to specific embodiments thereof, it will be apparent to one skilled in the art that various changes and modifications can be made therein without departing from the spirit and scope thereof.

This application is based on Japanese Patent Application No. 2012-164527 filed on Jul. 25, 2012 and Japanese Patent Application No. 2013-005311 filed on Jan. 16, 2013, the entire contents of which are incorporated herein by reference.

INDUSTRIAL APPLICABILITY

The white glass can be used in a housing of a portable electronic device such as a mobile phone.

DESCRIPTION OF REFERENCE NUMERALS AND SINGS

1: Housing
2: Conductor pattern
3: Connecting means (spring pin)
4: Circuit board
5: Conductor pattern
6: Display

The invention claimed is:

1. A colored glass comprising, in terms of mole percentage on the basis of the following oxides, from 50 to 80% of $SiO_2$, from 2 to 10% of $Al_2O_3$, from 11 to 30% of MgO, from 0 to 15% of $Na_2O$ and from 0.5 to 15% of $P_2O_5$ and in terms of mass percentage, more than 10% of MgO.

2. The colored glass according to claim 1, wherein a content of $Al_2O_3$ is 8% or less.

3. The colored glass according to claim 1, comprising from 3 mole % to 10 mole % of $Al_2O_3$.

4. The colored glass according to claim 1, wherein a content of $SiO_2$ is 55% or more.

5. The colored glass according to claim 1, wherein a content of $Na_2O$ is 1% or more.

6. The colored glass according to claim 1, comprising 10% or less of $P_2O_5$.

7. The colored glass according to claim 1, comprising 3% or more of $P_2O_5$.

8. The colored glass according to claim 1, comprising from 0 to 9% of $B_2O_3$.

9. The colored glass according to claim 1, comprising from 0 to 6% of $B_2O_3$.

10. The colored glass according to claim 1, comprising from 0 to 4.5% of $ZrO_2$.

11. The colored glass according to claim 1, comprising from 0 to 5% of $La_2O_3$.

12. The colored glass according to claim 1, comprising at least one of CaO, SrO and BaO in a total amount of from 0.2 to 12%.

13. The colored glass according to claim 12, comprising CaO in a range of from 0.2 to 3%.

14. The colored glass according to claim 1, wherein $MgO/SiO_2$ which is a ratio of a content of MgO to a content of $SiO_2$ is 0.45 or less and 0.14 or more.

15. The colored glass according to claim 1, comprising from 66 to 72% of $SiO_2$, from 2 to 4% of $Al_2O_3$, from 16 to 24% of MgO and from 4 to 10% of $Na_2O$.

16. The colored glass according to claim 1, comprising 58% or more and less than 66% of $SiO_2$, from 2 to 6% of $Al_2O_3$, from 11 to 18% of MgO, from 8 to 13% of $Na_2O$, and from 3 to 7% of $P_2O_5$.

17. The colored glass according to claim 1, comprising, in terms of mole percentage on the basis of the following oxides, from 60 to 73% of $SiO_2$, from 2 to 5% of $Al_2O_3$, from 13 to 30% of MgO, from 0 to 13% of $Na_2O$ and from 0.5 to 4.5% of $P_2O_5$.

18. The colored glass according to claim 1, wherein a crystal is not precipitated.

19. The colored glass according to claim 1, wherein a linear transmittance of light having a wavelength of 600 nm at a thickness of 1 mm is 50% or less.

20. The colored glass according to claim 1, wherein a total light reflectance of light having a wavelength of 600 nm is 30% or more.

21. A strengthened white glass obtained by chemically strengthening the white glass according to claim 1, the white glass comprising 1% or more of $Na_2O$, the strengthened white glass having a surface compressive stress layer having a thickness of 10 μm or more.

22. The strengthened white glass according to claim 21, wherein a total reflectance of light having a wavelength of 600 nm is 30% or more.

23. A method for manufacturing a strengthened white glass having a linear transmittance of light having a wavelength of 600 nm at a thickness of 1 mm of 50% or less, a surface compressive stress layer having a thickness of 10 μm or more, and a surface compressive stress thereof of 300 MPa or more, the method comprising chemically strengthening the white glass according to claim 1.

24. A colored glass comprising, in terms of mole percentage on the basis of the following oxides, from 66 to 72% of $SiO_2$, from 2 to 4% of $Al_2O_3$, from 16 to 24% of MgO, from 4 to 10% of $Na_2O$ and from 0.5 to 15% of $P_2O_5$.

* * * * *